(12) United States Patent
Cheng

(10) Patent No.: US 7,818,791 B2
(45) Date of Patent: Oct. 19, 2010

(54) FINGERPRINT AUTHENTICATION METHOD FOR ACCESSING WIRELESS NETWORK SYSTEMS

(75) Inventor: Sean I-Hsiang Cheng, Taoyuan (TW)

(73) Assignee: Mitac International Corporation, Taoyuan (TW)

( * ) Notice: Subject to any disclaimer, the term of this patent is extended or adjusted under 35 U.S.C. 154(b) by 964 days.

(21) Appl. No.: 11/617,321

(22) Filed: Dec. 28, 2006

(65) Prior Publication Data
US 2007/0239991 A1 Oct. 11, 2007

(30) Foreign Application Priority Data
Apr. 10, 2006 (TW) .............................. 95112629 A

(51) Int. Cl.
*G06F 17/30* (2006.01)
(52) U.S. Cl. .................................. 726/7; 726/3; 726/2
(58) Field of Classification Search .................... 726/7, 726/3, 2
See application file for complete search history.

(56) References Cited

U.S. PATENT DOCUMENTS

| | | | | |
|---|---|---|---|---|
| 6,018,739 | A * | 1/2000 | McCoy et al. | 707/999.102 |
| 7,088,220 | B2 * | 8/2006 | Kotzin | 455/411 |
| 2003/0012415 | A1 * | 1/2003 | Cossel | |
| 2008/0065892 | A1 * | 3/2008 | Bailey et al. | |
| 2009/0226052 | A1 * | 9/2009 | Fedele et al. | |

OTHER PUBLICATIONS

Service-oriented network management ; Chang Qian; Feng Bin; Song Junde; Info-tech and Info-net, 2001. Proceedings. ICII 2001—Beijing. 2001 International Conferences on; vol. 5; Publication Year: 2001 , pp. 170-174 vol. 5.*

An Abnormal Area Scanning for Scalable and Energy-Efficient and Secure SensorNet Management Hayoung Oh; Kijoon Chae; Multimedia and Ubiquitous Engineering, 2008. MUE 2008. International Conference on; Publication Year: 2008 , pp. 592-596.*

Research and Development of Monitoring System for Network Servers Zhenqi Wang; Yue Wang; Guangqiang Shao; Ziyan Guo; Wireless Communications, Networking and Mobile Computing, 2008. WiCOM '08. 4th International Conference on; Publication Year: 2008 , pp. 1-3.*

* cited by examiner

*Primary Examiner*—David Y Jung

(57) ABSTRACT

This invention provides a fingerprint authentication mechanism for accessing the wireless network system that is applicable to a wireless network communications apparatus, the mechanism including the steps of inputting data of users' fingerprints and converting the same into matrix data compliant with wireless network authentication bit ciphers; setting thresholds for pattern identification with respect to the matrix data as an authentication basis for determining if the user has access rights to the network system upon receipt of a request signal for network connection sent from a user end; and analyzing if the captured fingerprint of the user matches with the preset authentication data to determine if the wireless network communications apparatus is to be started for network connection, thereby increasing the quality, usability and safety of the wireless network connection to achieve an easier scheme of information security management.

7 Claims, 4 Drawing Sheets

FINGERPRINT AUTHENTICATION METHOD FOR ACCESSING WIRELESS NETWORK SYSTEMS

BACKGROUND OF THE INVENTION

1. Field of the Invention

The present invention relates to a user authorization authentication technique, and more particularly, to a fingerprint authentication method for accessing wireless networking systems.

2. Description of Related Art

Wireless networking technology has improved greatly in recent years, facilitating a trend away from wired networking to wireless networking. Presently, most wireless networks are installed at the user end, which puts much of the burden of controlling access rights to the wireless network at the user end. Except for the conventional and relatively insecure access control modes such as inputting account numbers and passwords, users often find other more robust methods too complicated to use or too difficult to implement in practical application. Moreover, such access control mechanisms and techniques are mostly designed to be implement at the user end. For example, a company employee may use a specific permit to obtain access to computer wireless networking; or simply log on to a computer system by inputting a legitimate user log-in account number and password to enter into a wireless networking system via an application program called "Network Connection" provided by the Windows operating system. However, this method of controlling wireless access rights is mechanical and inflexible. For instance, users are forced to input legal user account numbers and passwords in order to log in to the Windows operating system and perform desired tasks even if users do not need to use wireless networking, thereby greatly inconveniencing users at work.

To resolve the foregoing problem, Taiwanese Patent Publication Gazette No. 200529091 discloses a method that uses the input of fingerprints to help identify users, the method comprising first configuring URL web addresses or identification numbers, wherein account numbers and passwords of users are previously stored in an application program so that when users open the URL web addresses or the application programs, the users are instructed to input fingerprint images that are then converted to fingerprint identification codes that enables the fingerprint identification codes to be compared with pre-stored identification codes, and, if the codes match each other, corresponding user account numbers and passwords are then acquired to be automatic populated into corresponding form positions. Although this technique can simplify the steps for inputting user account numbers and passwords, it still utilizes user account numbers and passwords as a means and standard for authenticating users and granting user access to network resources, thus failing to address the risk of user account numbers and passwords being misappropriated. In addition, the foregoing method basically enforces access rights to a computer rather than the resources of a wireless network. In other words, this method utilizes computer techniques on the local computer to control network access, thus only indirectly limiting the use of wireless network resources. As such, it fails to effectively provide for the security of network resources.

In view of the drawbacks discussed above, Taiwanese Patent Publication Gazette N200605599 discloses a system to address such shortcoming comprising: a Pre-share Key that is divided into a user name (UN) portion and a password portion (PW); a secret key SKEYID deduced from the exchange definition of an Internet secret key (IKE); and a secret key value (HMAC_I) integrating a user name and a password added to a message abstract functional sector, thus enabling an initiator to transmit the secret key value to a responder. Thereafter, the responder calculates the secret key values of all users in a user database and stores the calculated result; and, when the responder receives the user secret key value (HMAC_I) that is compared with the secret key value stored in the database, a secret key value (HMAC_R) is calculated based on the result of the comparison and transmitted to the initiator so as to analyze whether the result of the comparison is correct or not. If the result is correct, the responder and the initiator are connected, whereas if the result is incorrect, the connection between the two is terminated. However, this technique is deficient in that the transmission of these authentication messages between the responder and the initiator need to continue without interruption to provide authentication, and if the computer of the initiator or the responder is invaded by a virus program, such as a worm virus program or a malicious hacking intention, the infected computer can continuously send out such messages, which can adversely affect system performance. Moreover, if the initiator (or the responder) is an access point (base station) for a wideband wireless network, because of its CSMA-CA's TDMA nature, the effective connection speed for other connected users will be seriously reduced by the numerous requests and/or responses involving authentication, so much so that it may even paralyze the whole network system as a result. The possibility of this situation can be happened by choosing either the PCF (Point Coordination Function) or DCF (Distributed Coordination Function) MAC state machine for WLAN operation. Such a scenario is shown in FIG. 1, where a personal computer at a user end 31' continuously transmits an account number and password to request network connection, which, in turn, causes the wireless network switch apparatus 5' providing an access point to respond continuously, thus adversely affecting the quality and speed of connection provided by the wireless network switch apparatus 5' to other users 32' of the Internet 7'.

Therefore, it is highly desirable for the industry to develop a novel mechanism that can improve on the drawbacks of prior art techniques by more easily controlling wireless network access and that is also convenient to manage and maintain, thus preventing access authentication problems that decrease the efficiency of wireless network utilization, thereby increasing the quality of wireless network connection, and effectively increasing the safety of the verification mechanisms use to achieve information resource security.

SUMMARY OF THE INVENTION

The present invention aims to eliminate the aforementioned drawbacks, and, as such, a primary objective of the present invention is to provide a fingerprint authentication method for accessing wireless network systems that can improve on the connection quality of wireless networking.

Another objective of the present invention is to provide a fingerprint authentication method for accessing wireless network systems that can increase the reliability of the authentication mechanism for efficient information management.

Another objective of the present invention is to provide a fingerprint authentication method for accessing wireless network systems that can increase the convenience of authentication operations.

In order to achieve the above and other objectives, the present invention provides a fingerprint authentication method for accessing wireless network systems applicable to a wireless network communications apparatus, the fingerprint authentication method at least comprising the steps of: (1) inputting authentication data such as fingerprints for authenticating users via a biometric data input module; (2) converting the data representing users' fingerprints into first matrix data compliant with wireless network authentication bit ciphers; (3) storing the first matrix data in a management information base (MIB) database; (4) setting a threshold for the pattern identification processing with respect to the first matrix data; (5) converting the captured fingerprint data to second matrix data compliant with wireless network authentication bit ciphers in a Station Management Entity (SME) upon input of fingerprints via the biometric data input module by users; (6) comparing the second matrix data with the first matrix data stored in the MIB database, and further acquiring the actual threshold for the pattern identification; (7) determining whether the actual threshold for the pattern identification matches the preset threshold for the pattern identification, and, if the thresholds match one another, the wireless network communications system will be actuated, whereas, if the input finger pattern fail to reach the threshold, the system will not be started.

The biometric data input module is a fingerprint input device installed in either a wireless network communications apparatus or an operating apparatus at a user end. Preferably, the biometric data input module is externally connected to a wireless network communications apparatus or a user-end operating apparatus, wherein the biometric data input module connects to the wireless network communications apparatus or the user-end operating apparatus via one selected from the group consisting of a blue tooth interface, an infrared transmitting and receiving interface, a RJ-45 interface, a USB interface, a UWB wireless USB interface, and a LPT interface. Further, the first and the second matrix data are encrypted data using at least 40-bit encryption, and the memory unit is configured in an management information base (MIB) database and uses Wired Equivalent Privacy (WEP) preset golden keys (dot11WEPDefaultKeys) according to the 802.11 specification. In one preferred embodiment, the MIB database is configured to store data multiple sets of fingerprints of legitimate users. Moreover, the actuation of the wireless network communications apparatus is controlled by a wireless switching element.

The fingerprint authentication method for accessing wireless communications systems disclosed by the invention features using fingerprint data as the basis for user-authentication for accessing wireless network resource, which is implemented by inputting fingerprint data to authenticate a user's access rights to wireless networking resources; and based on the fingerprint authentication result, further determining whether the wireless network communications system is to be actuated for network connection operations. The present invention offers advantages over the prior art techniques in that it can increase the quality of the wireless network connection to increase the usage rate for wireless network resources. Moreover, biometric data for the unique features of human beings, e.g., the users' fingerprints, is used for authentication of access control to a wireless network in place of account numbers and passwords as used in the prior art. It can effectively enhance security and reliability of the authentication mechanism, thereby achieving information management security and increasing the convenience of operations as the authentication data remains effective even when a network system is changed.

BRIEF DESCRIPTION OF DRAWINGS

The fingerprint authentication method for accessing wireless network systems of the present invention can be fully understood by reading the following detailed description of the preferred embodiments, with reference made to the accompanying drawings, wherein.

DETAILED DESCRIPTION OF PREFERRED EMBODIMENT

The present invention is described in the following so that one skilled in the pertinent art can easily understand other advantages and effects of the present invention. The present invention may also be implemented and applied according to other embodiments, and the details may be modified based on different views and applications without departing from the spirit of the invention.

Figure 1:
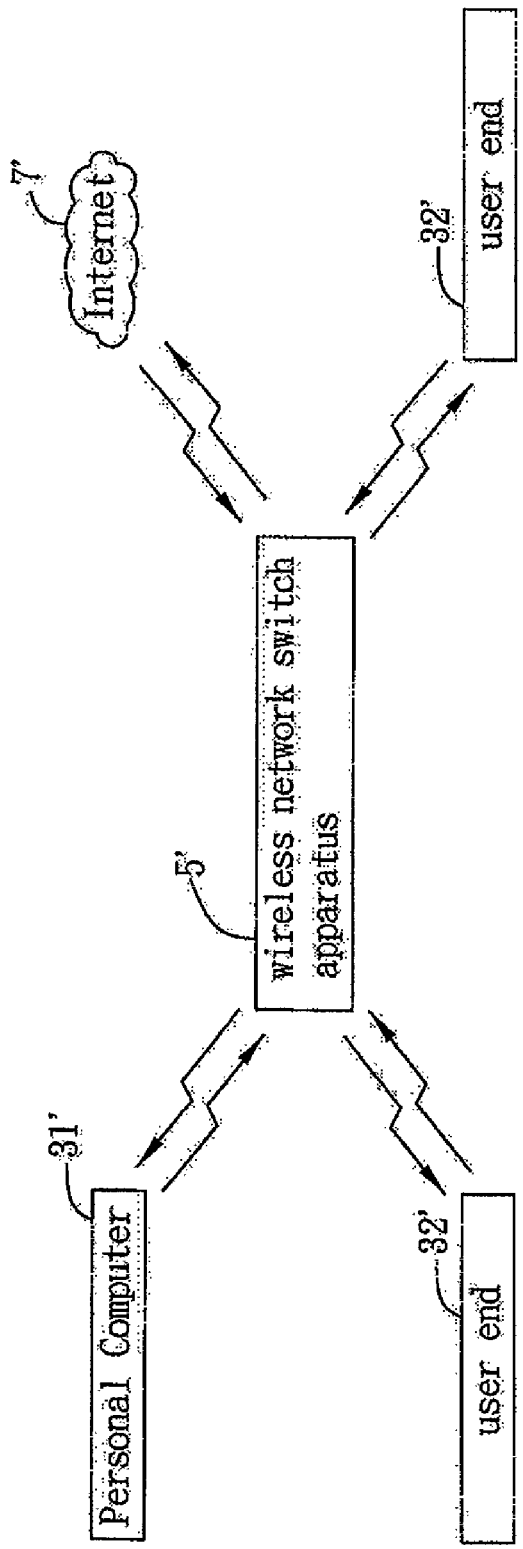
FIG. 1 (PRIOR ART) is a diagram illustrating a known wireless network apparatus structure.
Figure 2:
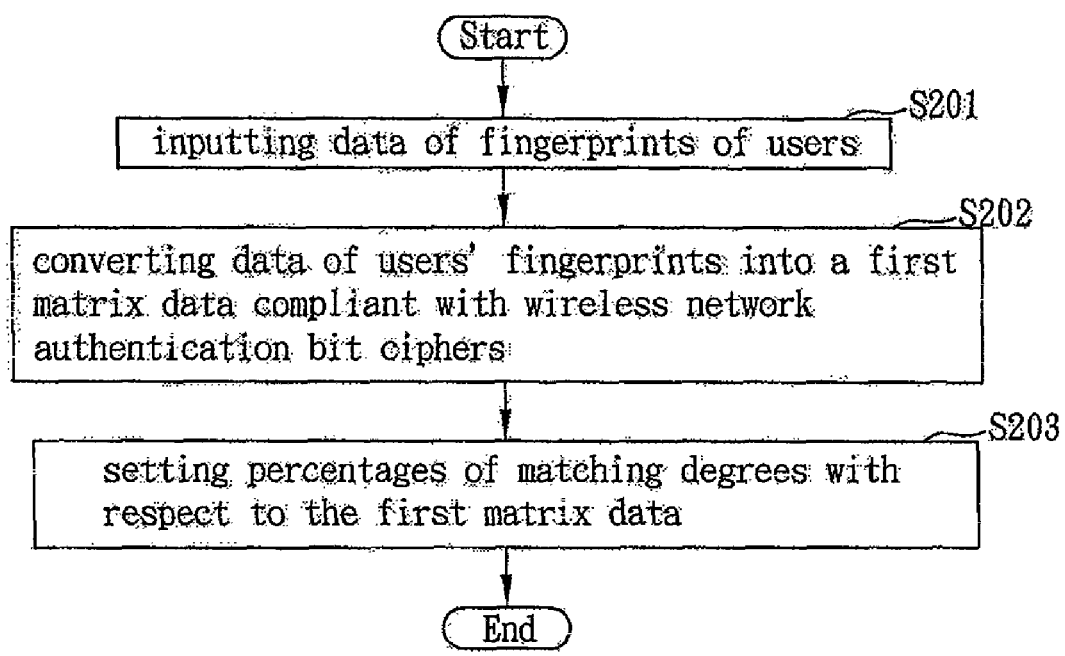
FIG. 2 is a flow chart of the steps involved in inputting fingerprints for the fingerprint authentication method for accessing a wireless network in accordance with the present invention.
Figure 4:
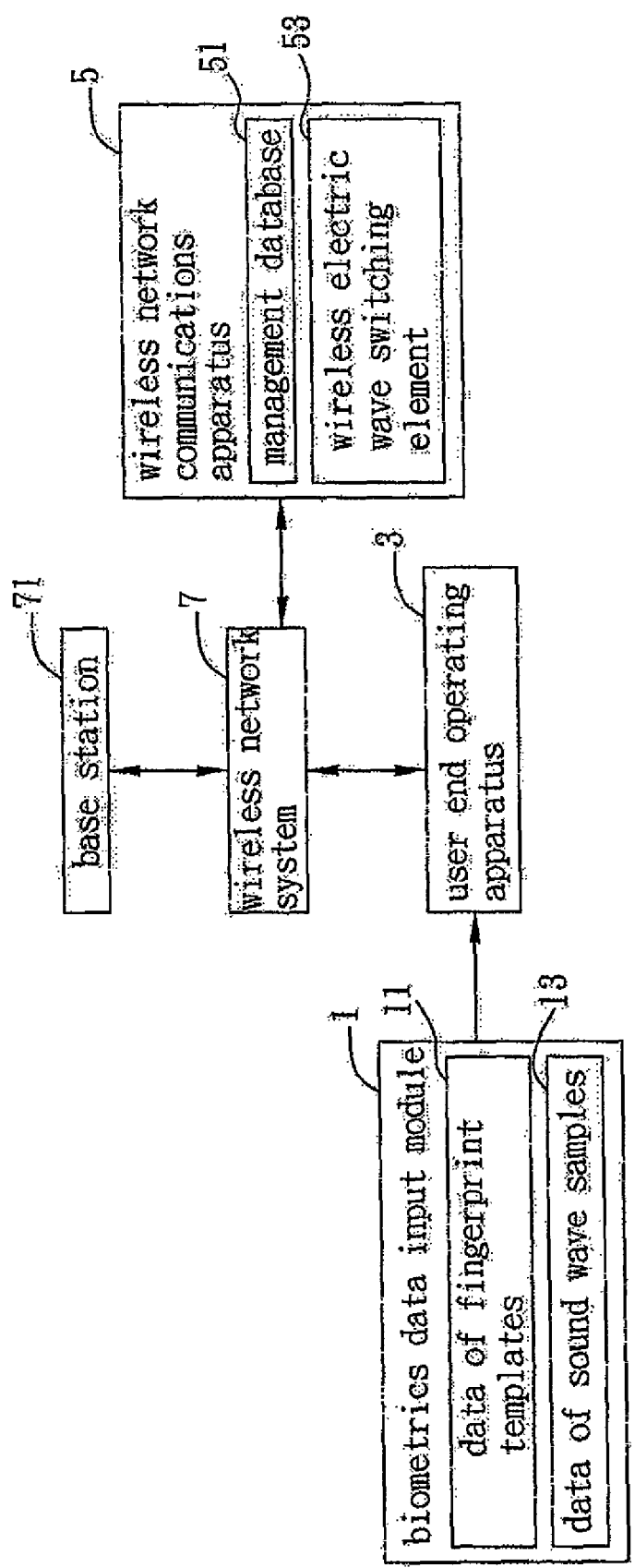
FIG. 4 is a diagram of a hardware configuration applicable to the fingerprint authentication method for accessing a wireless network in accordance with the present invention.

FIG. 2 is a flow chart of the steps involved in setting authentication data for the fingerprint authentication method for accessing a wireless network of the invention. This embodiment is to be viewed in conjunction with FIG. 4, in which the fingerprint authentication method for accessing the wireless network is applied to a wireless network system 7 that connects to a wireless network communications apparatus 5 and to a user end operating apparatus 3, wherein the user end operating apparatus may be a personal computer (PC), a notebook computer (NB), a personal digital assistant (PDA), a hand-held computer such as an ultra-mobile PC (UMPC), or any other suitable electronic computing device, and the wireless network communications apparatus 3 is a wireless network switching device.

As shown in the FIG. 2, step S201 is first executed to input fingerprint data 11 of users who have the access rights to the wireless network by means of a biometric data input module 1. Note that the authentication data is not limited to fingerprints as disclosed in this embodiment. For example, the biometric data input module 1 may capture vocal prints 13 of users to serve as the basis for access authentication for wireless networks. And other kinds of biometric recognition are possible such as retinal scans, signature or voice . In this embodiment, the biometric data input module 1 is a fingerprint input device externally connected with the wireless network communications apparatus 5 and the user end operating apparatus 3 and is adapted for performing data transmission operations. Further, the authentication data of fingerprints of the legitimate users is stored in an MIB database 51 of the wireless network communications apparatus 5 as individual biometric authentication samples. Then, step S202 is executed.

In step S202, fingerprint data 11 is converted into first matrix data compliant with wireless network authentication bit ciphers via a biometric data input module 1. In this embodiment, the first matrix data is encrypted data using at least 40-bit encryption and uses Wired Equivalent Privacy (WEP) preset golden keys (dot11WEPDefaultKeys) according to the 802.11 specification stored in a memory unit of the MIB database 51 of the wireless communications apparatus 5. Next, step S203 is executed.

In step S203, if the input fingerprint pattern reach the pre-defined threshold, with respect to the first matrix data, that is, degrees of matching with the wiring equivalent privacy rights preset golden keys are configured to be used for authentication operations for access rights to wireless networks.

Figure 3:
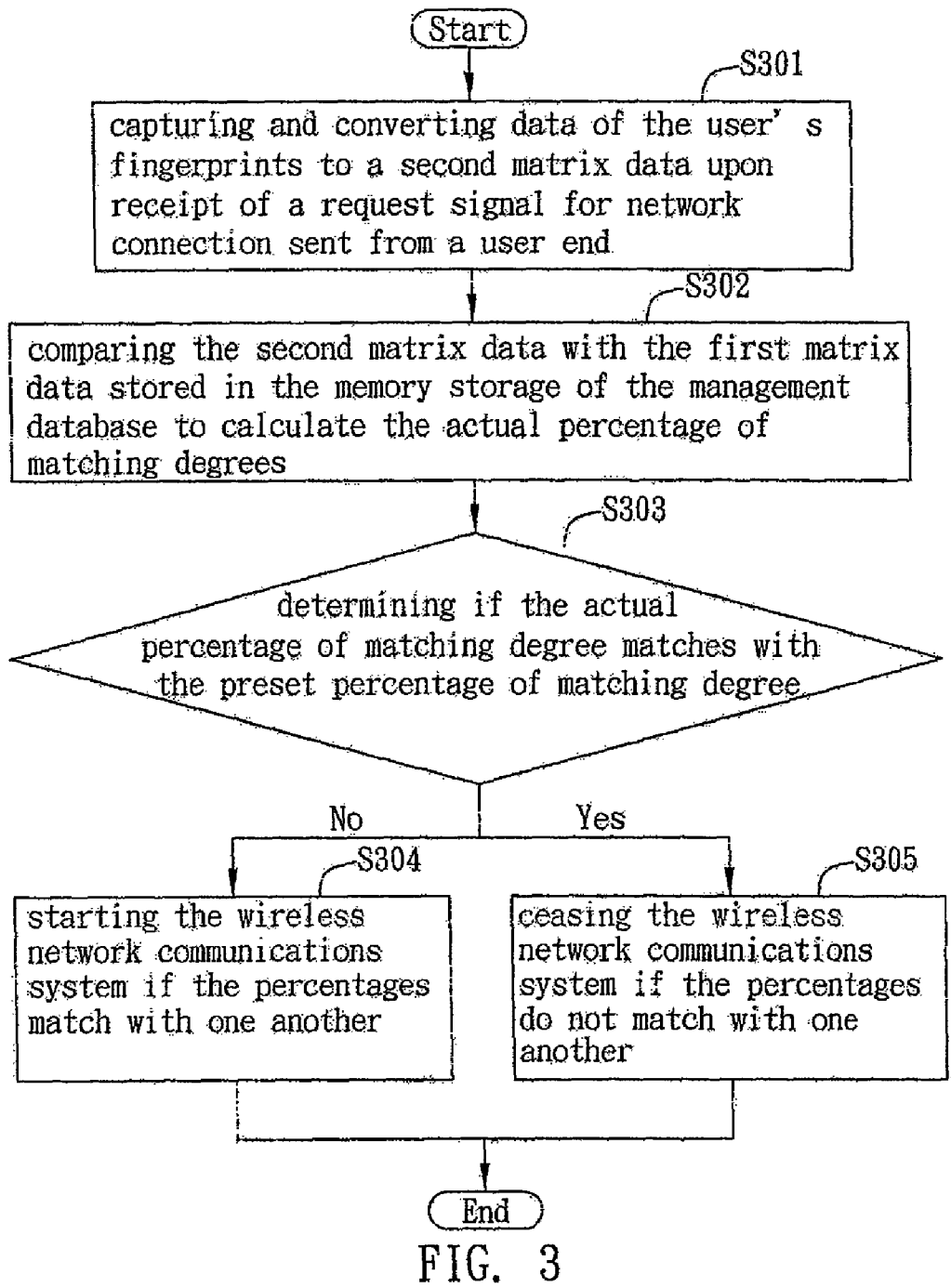
FIG. 3 is a flow chart of the steps involved in an authentication process of the fingerprint authentication method for accessing a wireless network in accordance with the present invention.

FIG. 3 is a flow chart of the steps involved in the authentication process for the fingerprint authentication method of the invention. Again viewing in conjunction with FIG. 4, step S301 is first executed to send out a request signal for network connection from the user end operating apparatus 3, to input a user's fingerprint data via the biometric data input module 1, and after the pattern recognition process, to further convert the captured fingerprint data to second matrix data compliant with wireless network authentication bit ciphers in a Station Management Entity (SME). In this embodiment, the Station Management Entity (SME) refers to a wireless base station 71 management entity connected with the wireless network system 7 that connects to each Access Point (AP). Next, step S302 is executed.

In step S302, the second matrix data is compared with the first matrix data stored in the MIB database 51 of the wireless network communications apparatus 5 to calculate and acquire the actual threshold for pattern identification. Thereafter, step S303 is executed.

In step S303, the actual threshold for pattern identification is acquired and compared with the preset threshold for pattern identification stored in the MIB database 51 of the wireless network communications apparatus 5. In this embodiment, if the actual input fingerprint pattern fails to reach the preset threshold of matching degrees, a user's access to wireless network resources is denied and step S304 is executed; and if the thresholds match one another, then step S305 is executed to start the wireless network communications system.

In step S304, the request signal for network connection sent from the user end operating apparatus 3 is denied. That is, the wireless network communications system is not actuated.

In step S305, the user end operating apparatus 3 is authorized to execute a request for wireless network connection. That is, the wireless network communications apparatus 5 is actuated by a wireless switching element 53 and is awaiting the wireless base station 71 to take turns to inquire and to handle requests for data transmission to allow the user end operating apparatus 3 to access to the wireless network system 7.

Compared to prior techniques, the fingerprint authentication method for accessing the wireless network disclosed by the invention is characterized by the use of fingerprint authentication data as the basis for authenticating a users' access right to wireless network resources, which is implemented by inputting fingerprint data for authenticating a user's access rights to the wireless network resources, wherein authentication information refers to converted fingerprint data into matrix data compliant with wireless network authentication bit ciphers that are to be selected by the user, and also thresholds for pattern identification are set for the subsequent comparison, so as to determine whether the actual threshold for pattern identification matches the preset threshold for pattern identification, and if the input fingerprint patterns match one another, the wireless network communications system will be actuated, whereas if the input fingerprint patterns do not match each other, the system will not be started.

The present invention is highly advantageous in that it can prevent wireless network bandwidth from being occupied by inordinate connect requests that affect the overall throughput of data, and it can increase the connection quality of the wireless network to increase the utilization rate of wireless network resources. Moreover, as biometric data of unique features for human beings, e.g., the user fingerprints, are used for authentication of access control to a wireless network in place of account numbers and passwords as used in the prior art, the security and reliability of the authentication mechanism are greatly enhanced, thereby achieving efficient management of information security and increasing the convenience of operations as authentication data remains effective even when the network system is changed.

The aforementioned embodiments are only exemplary preferred embodiments of the present invention. The scope of the claims as stated below should be accorded the broadest interpretation so as to encompass various modifications and similar arrangements made to the herein described invention provided that they fall within the spirit of the basic principles and technology of the present invention.

What is claimed is:

1. A fingerprint authentication method for accessing wireless network systems, which is applied to a wireless network communications apparatus, the fingerprint authentication method at least comprising the steps of:
   (1) inputting fingerprint data of users via a biometric data input module that is installed in the wireless network communications apparatus or an operating apparatus at a user end;
   (2) converting fingerprint data into first matrix data compliant with wireless network authentication bit ciphers;
   (3) storing the first matrix data in a memory storage unit of a management information base (MIB) database;
   (4) setting a threshold for pattern identification with respect to the first matrix data;
   (5) converting the captured fingerprint data to second matrix data compliant with wireless network authentication bit ciphers in a Station Management Entity (SME) upon input of fingerprints via the biometric data input module by users;
   (6) comparing the second matrix data with the first matrix data stored in the memory storage unit of a management information base MIB database, and further acquiring the actual threshold for pattern identification; and
   (7) determining whether the actual threshold for pattern identification matches the preset threshold for pattern identification, and if the thresholds match one another, the wireless network communications system will be actuated, and otherwise, if the input fingerprint pattern of matching degrees do not reach the threshold, the system will not be started.

2. The fingerprint authentication method according to claim 1, wherein the biometric data input module is a fingerprint input device.

3. The fingerprint authentication method according to claim 1, wherein the biometric data input module is externally connected with one of the wireless network communications apparatus and the operating apparatus at a user end.

4. The fingerprint authentication method according to claim 3, wherein the biometric data input module connects to the wireless network communications apparatus and the user-end operating apparatus via one selected from the group consisting of a blue tooth interface, an infrared transmitting and receiving interface, a RJ-45 interface, a USB interface, a UWB wireless USB interface, and a LPT interface.

5. The fingerprint authentication method according to claim 1, wherein the user end operating apparatus is one selected from the group consisting of a personal computer (PC), a notebook computer (NB), a personal digital assistant (PDA), and a hand-held computer.

6. The fingerprint authentication method according to claim 1, wherein the memory storage unit is configured in an management information base (MIB) database using Wired Equivalent Privacy (WEP) preset golden keys (dot11WEPDefaultKeys) according to the 802.11 specification.

7. The fingerprint authentication method according to claim 1, wherein the start of the wireless network communications apparatus is controlled by a wireless radio-connected switching element.

* * * * *